United States Patent
Quach et al.

(10) Patent No.: US 7,417,534 B2
(45) Date of Patent: Aug. 26, 2008

(54) U-TURN SIGNAL DEVICE FOR MOTOR VEHICLES

(76) Inventors: Tuan Kim Quach, 6732 Wells Spring St., Mira Loma, CA (US) 91752; Tony Quach, 6732 Wells Spring St., Mira Loma, CA (US) 91752; Yanxia Guo, 9311 W. Hazelwood St., Phoenix, AZ (US) 85037

( * ) Notice: Subject to any disclaimer, the term of this patent is extended or adjusted under 35 U.S.C. 154(b) by 191 days.

(21) Appl. No.: 11/381,492

(22) Filed: May 3, 2006

(65) Prior Publication Data

US 2007/0132573 A1    Jun. 14, 2007

Related U.S. Application Data

(60) Provisional application No. 60/677,486, filed on May 3, 2005.

(51) Int. Cl.
*B60Q 1/26* (2006.01)
(52) U.S. Cl. .................................. 340/468; 340/475
(58) Field of Classification Search ................ 340/468, 340/465, 463, 464, 475
See application file for complete search history.

(56) References Cited

U.S. PATENT DOCUMENTS

| | | | | |
|---|---|---|---|---|
| 4,868,541 A * | 9/1989 | Sullivan et al. | ............. | 340/465 |
| 5,663,708 A * | 9/1997 | Strawn | ........................ | 340/465 |
| 6,043,740 A * | 3/2000 | Tan | ............................ | 340/475 |
| 6,195,001 B1 * | 2/2001 | Haddad et al. | .............. | 340/475 |
| 6,958,687 B1 * | 10/2005 | Smith | ......................... | 340/468 |
| 7,167,086 B1 * | 1/2007 | Goins | ......................... | 340/465 |
| 7,218,212 B2 * | 5/2007 | Hu | ............................. | 340/465 |
| 7,245,209 B2 * | 7/2007 | Sanicola | ..................... | 340/475 |

* cited by examiner

*Primary Examiner*—Phung Nguyen
(74) *Attorney, Agent, or Firm*—Michael J. Hughes; Intellectual Property Law Offices (57) ABSTRACT

U-turn signaling device for vehicles is disclosed, which includes an LED array, and an integrated circuit control circuit which is produces LED activation control signals. These control signals activate the LED array to produce at least three modes of activity including a tail light mode, a turn mode and a U-turn mode in response to activation signals from the tail light, turn signal and U-turn signal respectively. The LED array can be a portable LED array, an embedded LED array or a double-sided LED array. The LED array is a preferably a combo LED array and further includes a monitor screen, which may be mounted in the dashboard of the vehicle, and may include a multi-position turn signal switch. Also disclosed is a flexible U-turn signal device, which may be activated by a wireless remote control switch.

18 Claims, 5 Drawing Sheets

FIGURE 13

U-TURN SIGNAL DEVICE FOR MOTOR VEHICLES

The following claims priority from provisional patent application 60/677,486, filed May 3, 2005 to the same inventors.

TECHNICAL FIELD

The present invention relates generally to the field of signaling devices for motor vehicles, and more particularly to a U-turn signaling device for motor vehicles.

BACKGROUND OF THE INVENTION

The present invention relates to a motor vehicle signaling device and more particularly to a vehicle U-turn Signal Device to provide a U-turn Signal when a vehicle intends to make a U-turn.

Three hundred twenty million motor vehicles are registered in the United States in the year 2004. These many running vehicles can cause numerous traffic accidents. Performing a U-turn is considered statistically the most dangerous component in a great variety of accidents, even if most of local ordinances restrict making a U-turn on some stream of traffic. The statistical incidence of U-turns still shows that the rate of collision accidents is extremely high because other drivers often misunderstand the signal for a U-turn as a left turn. Therefore, it is very important that a driver be able to particularly indicate his intention to make a U-turn so others can get an early warning of this intention. This ability to signal the intention to perform a U-turn would be an advantage for all vehicles, but especially for semi-trucks because of their large turning radius when making a U-turn at an intersection.

In general, various relevant prior art lighting and signaling systems and the like, as well as apparatus and methods of their construction are found to be known and exemplified in the following U.S. patents: U.S. Pat. No. 5,003,289; U.S. Pat. No. 5,663,708; U.S. Pat. No. 5,281,950. These patents and other known prior signal devices may be suitable for their particular purpose, however, from their lighting components, signaling control method, device structure to installation aspect, these devices may benefit from a more versatile structure and more convenient installation.

An auxiliary U-turn signal indicating light attachment having a U-shape housing to be mounted on the lower left corner of the rear window of a vehicle is disclosed in U.S. Pat. No. 5,003,289 entitled "U-TURN SIGNAL ATTACHMENT". The apparatus encloses a U-turn signal indicating lamp and manually operated switch for energizing the U-turn signal lamp. It requires replacement of lamp since its life span is limited.

Another U-turn signal device is disclosed in U.S. Pat. No. 5,663,708, entitled "U-TURN SIGNAL APPARATUS". The U-turn Signal Apparatus includes a vehicle with a front end and a rear end having two colored lights. The colored front left light is situated on the front end at a left extent thereof and rear left light is situated on the rear end at a left extent thereof. They are positioned adjacent to a conventional front left light and a conventional reverse rear light. The control circuitry is adapted to actuate the front left light and the rear left light at the discretion of the user. It has utility of combining the U-turn signal to the conventional signaling system in new automobile development, but for after-market vehicle signaling assembling, it is not convenient.

Another U-turn signal device is disclosed in U.S. Pat. No. 5,281,950 entitled "VEHICLE U-TURN SIGNAL SYSTEM CONTROL". The U-turn signal control can drive from one to multiple illuminated U-turn signals. The controller utilizes input from the factory original equipment turn signal actuator to turn it on and off. Even if it does not need an additional switch to operate the signal device, there is still the same problem as above.

Thus, there is a need in the art for a vehicle signaling device using an LED array as lighting components instead of using lamps. There is also a need for changing the traditional on and off signaling method, to a control circuit which controls the U-turn signal flashing and moving in a specific direction and frequency.

DISCLOSURE OF INVENTION

Briefly, one preferred embodiment of the present invention is a U-turn signaling device for vehicles, which includes an LED array, and an integrated circuit control circuit which produces LED activation control signals. These control signals activate the LED array to produce at least three modes of activity including a tail light mode, a turn mode and a U-turn mode in response to activation signals from the tail light switch, turn signal switch and U-turn signal switch respectively. The LED array can be a portable LED array, an embedded LED array or a double-sided LED array. The embedded LED array can be included as part of the left rear signal light of a vehicle or the front light assembly of a vehicle.

The LED array is a preferably a combo LED array and the U-turn device further includes a monitor screen, which may be mounted in the dashboard of the vehicle, and may include a multi-position turn signal switch.

The LED may also be a flexible LED array which may be activated by a wireless remote control switch.

An advantage of the present invention is that the U-turn signal device is easily retro-fittable to existing after-market vehicles.

Another advantage of the present invention is that the U-turn signal device preferably uses LEDs which do not wear out like conventional bulbs And another advantage of the present invention is that one embodiment of the U-turn signal device uses flexible LEDs which are more easily adapted to a variety of car models.

A further advantage of the present invention is that the U-turn signal device provides a U-turn signal for motor vehicles which is convenient to install and use.

A yet further advantage is that the present invention is that the U-turn signal device provides a U-turn signal which requires reduced maintenance.

Yet another advantage of the present invention is that the U-turn signal device includes an IC circuit which produces multiple modes of activity for indicating a U-turn, a stop light and a left turn.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

FIG. 5 illustrates the structure of a combo portable U-turn signal device of the present invention;

BEST MODE FOR CARRYING OUT THE INVENTION

The following detailed description is of the best modes of carrying out the invention. The description is not to be taken in a limiting sense, but is made merely for the purpose of illustrating the general principles of the invention, since the scope of the invention is best defined by the appended claims.

The present invention includes various types which pertain to all new automobile development, and more particularly for an after-market signaling assembly.

Figure 1:
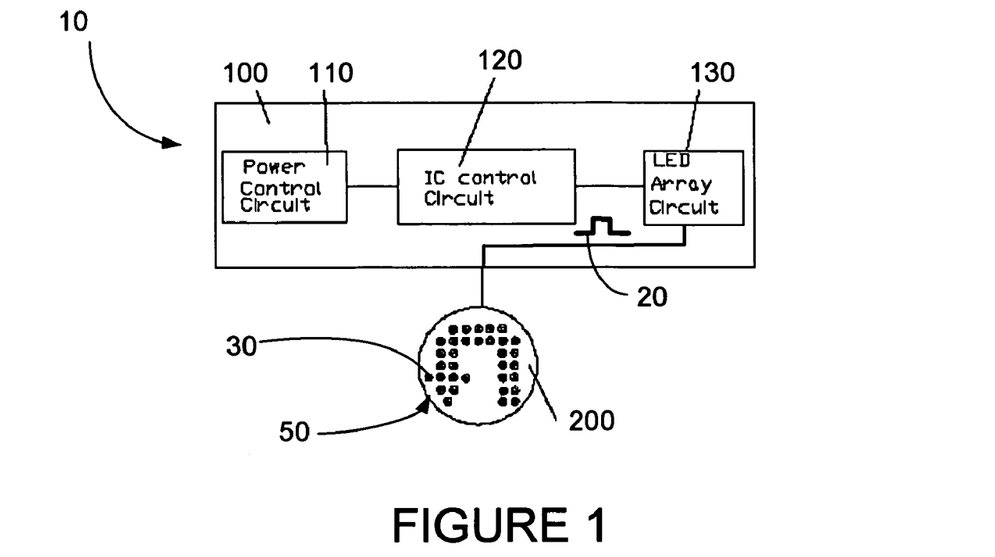
FIG. 1 shows a block diagram of the major functional blocks of the U-turn signal device of the present invention.

FIG. 1 shows a block diagram of the major elements of the control circuit 100 of the U-turn signal 10 of the present invention. The control circuit 100 includes power control circuit 110, programmed IC control circuit 120 and LED array control circuit 130. Power for this circuit is supplied by the existing power supply of the vehicle. This control circuit 100 produces a variety of signals 20 which operates the LED array 200, causing it to flash and move in one of a variety of specific frequencies and directions. The signal 20 is depicted by a single wave form, but actually includes information which causes the individual LED elements 30 of the LED array 200 to light in a variety of specific patterns and use a specific firing sequence, which will result in the display 50 of a U-turn arrow signal 10. The U-turn signal 10 may be as simple as a dedicated array of LEDs in the shape of a U-turn arrow, or, as discussed below, preferably includes a grid of LED elements which may be used to pattern either a U-turn or other signals.

Figure 8:
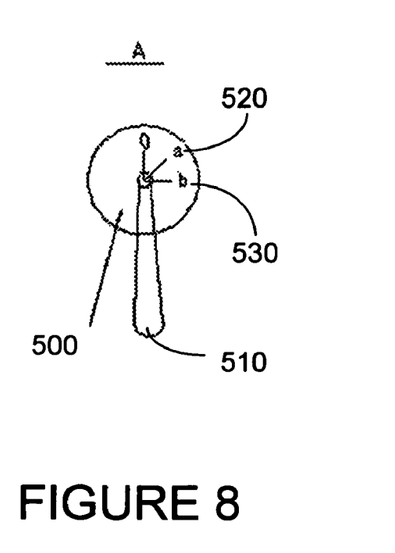
FIG. 8 illustrates the operation of the U-turn signal of the present invention.

With general reference to the drawings, from FIG. 1 to FIG. 10, the U-turn signal device 10 generally includes an LED array 200, a U-turn activation switch 500 and control circuit 100. The U-turn Signal indicates the intention of performing a U-turn. The signal color preferably is amber which is generally recognized as the color that warns of a dangerous condition or that a driver should be alert to conditions. The U-turn switch 500 turns on the signal device 10 when the driver wants to make a U-turn. There are a variety of U-turn switches contemplated by the present invention. It can be a remote control switch or a regular switch for vehicle on the current market. For an "embedded" U-turn signal device, a multi-position turn signal switch 500, which is built into the steering column, is shown in FIG. 8.

The following are the detailed descriptions of various types of U-turn signal devices.

Figure 2:
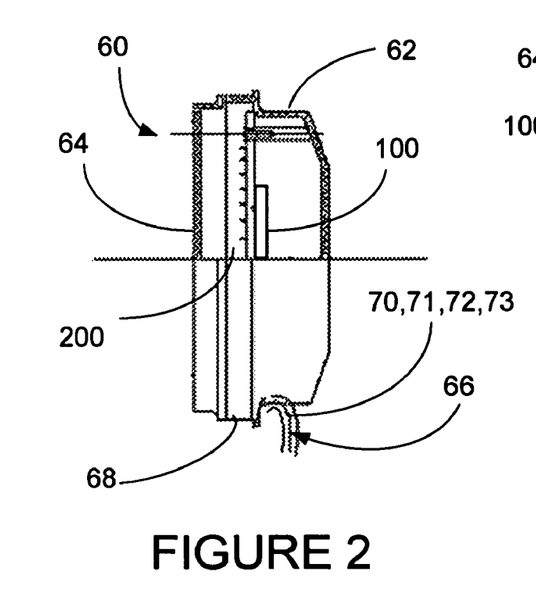
FIG. 2 illustrates a single portable U-turn signal device of the present invention.

With reference to FIG. 2, a side partial cross-section view is shown of a single-sided U-turn signal 60, which includes a case 62, having a transparent window 64, which encloses the LED array 200. A power and signal cord 66 is included which carries activation signals and supply power to activate the LED array 200. The power and signal cord 66 preferably includes four wires, including a ground wire 70, a U-turn switch indicator line 71, a line which provides on/off state data from the existing tail light system, i.e. tail light status line 72, and a fourth line that provides data from the turn signal indicator system i.e. turn signal indicator 73.

An IC control circuit 100 receives the power input and status report data and generates control signals which are relayed to the LED array 200. A portion of the case 62 serves as a mounting bracket 68, as the single sided U-turn device 60 is preferably mounted on rear end of a truck to replace the existing turn light.

Figure 3:
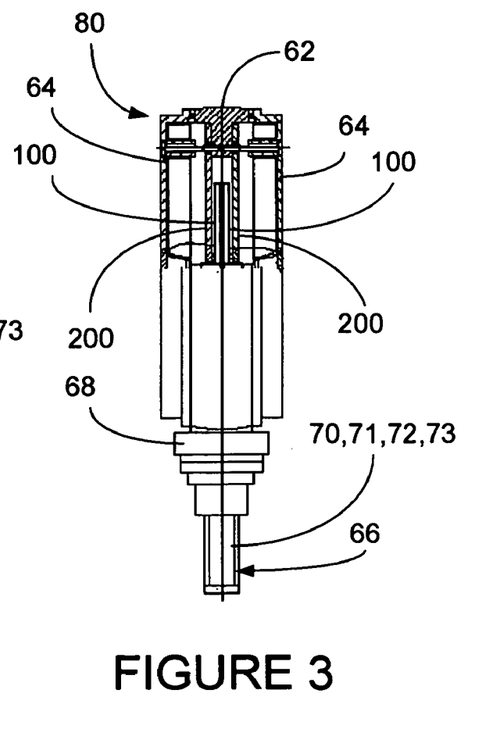
FIG. 3 illustrates a double-sided portable U-turn signal device of the present invention.

FIG. 3 shows a side partial cross-section view is shown of a double-sided U-turn signal 80, which again includes a case 62, having transparent windows 64, which encloses two LED arrays 200, and an IC control circuit 100. A power and signal cord 66 is included which connects to the LED arrays 200, and carries activation signals and supply power including a ground wire 70, a U-turn switch indicator line 71, tail light status line 72, and turn signal indicator 73 to activate the LED arrays 200. Again, a portion of the case 62 serves as a mounting bracket 68, as the double sided U-turn display 70 is intended to be mounted on the cover top of the left front wheel or other location where it can be seen by cars approaching the vehicle from either the front or rear.

Figures 4, 5A, 5B:
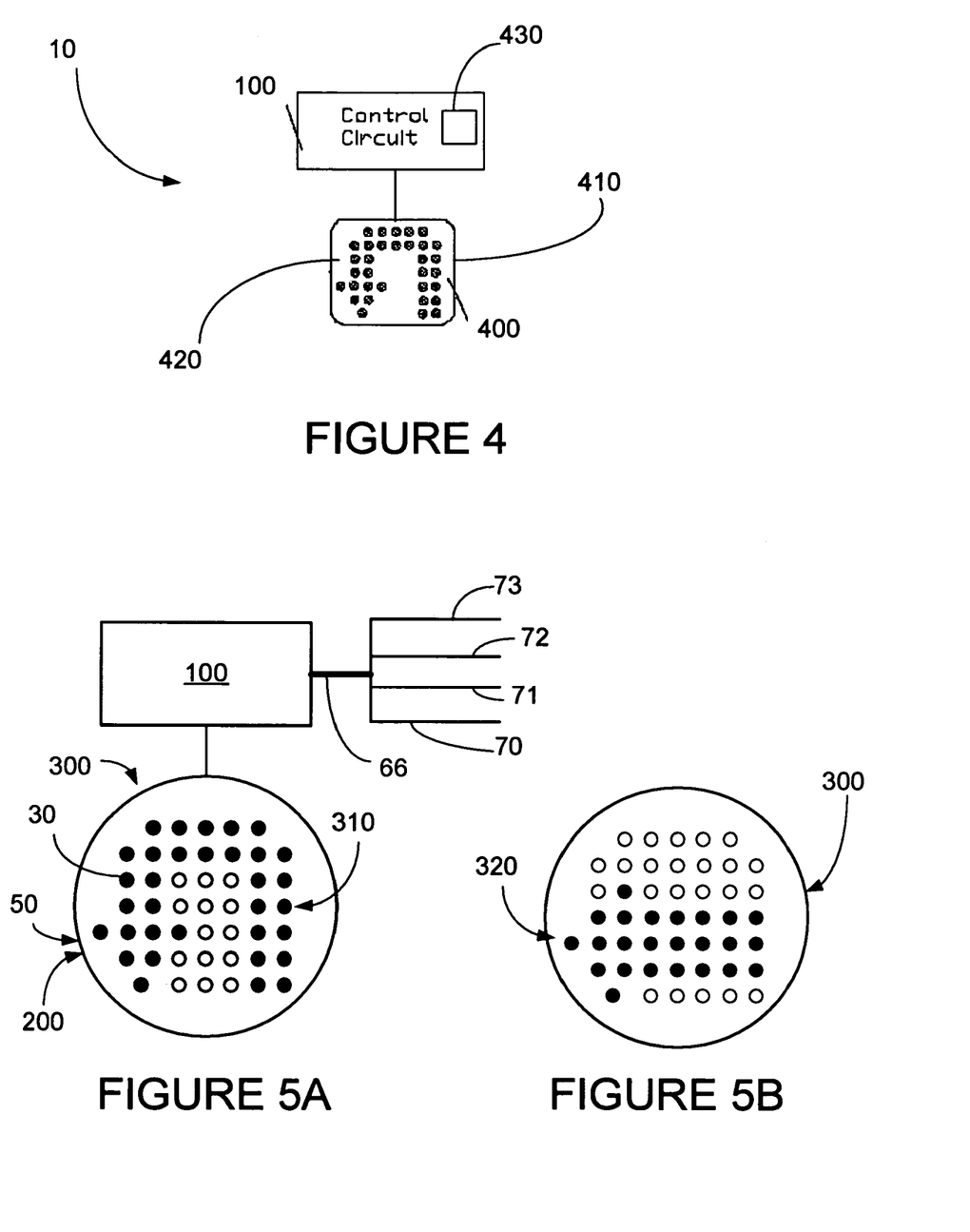
FIG. 4 illustrates the structure of a flexible U-turn signal device of the present invention.
Figure 6:
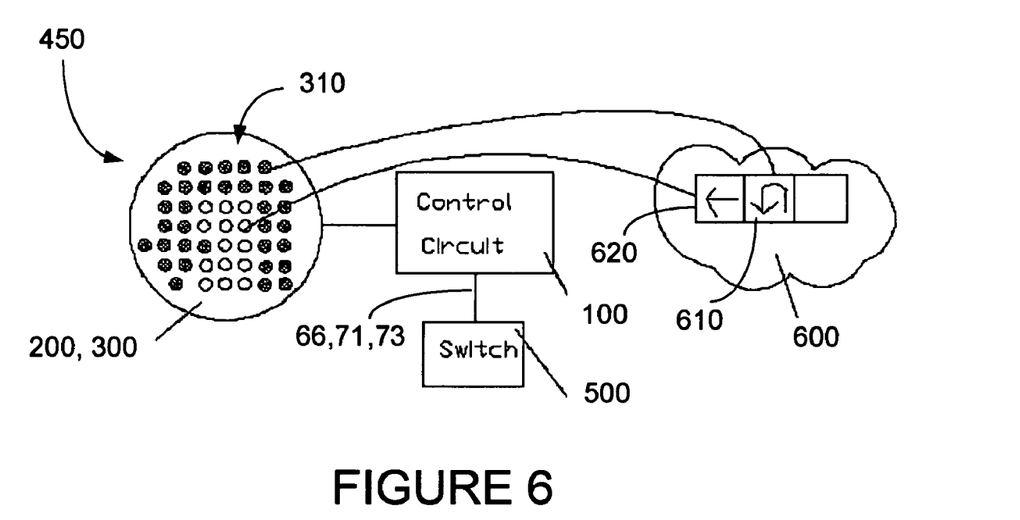
FIG. 6 illustrates the structure of an embedded U-turn signal device of the present invention.
Figure 7:
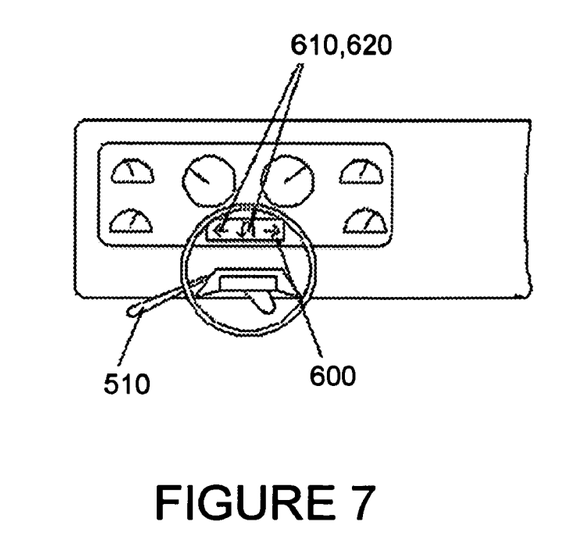
FIG. 7 illustrates the multi-position turn signal switch and monitor of an embedded U-turn signal device of the present invention in the driver's compartment.
Figure 11:
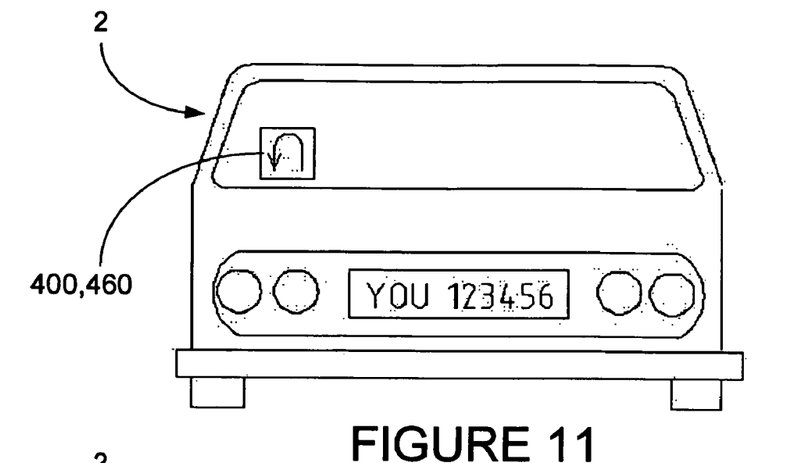
FIG. 11 illustrates the mounting point of a flexible U-turn signal device of the present invention.

With reference to FIG. 4, a flexible U-turn Signal Device 400 is shown which includes a flexible LED array 400 and Control Circuit 100. They are integrated on a flexible printed circuit 410, and is preferably controllable by a wireless remote switch 900 (see FIG. 13). When the driver wants to make U-turn, he or she pushes the "on" button 920, and the signal device 10 turns on. When U-turn is finished, the driver pushes the turn "off" button 930 and the U-turn signal device 10 turns off. The flexible U-turn signal device 400 is covered by a clear, elastic plastic cover 420. The LEDs are configured in a U-shape. The control circuit 100 produces a pulse signal and makes the LED array 400 flash and create a moving light pattern along the LED display 400. As the name implies, the flexible U-turn signal device 400 is very thin. Its thickness is typically around 5 mm. FIG. 11 shows one of its mounting points. It can be attached at any place desired, such as window shield, rear window, etc. It is thus one of a number of variations of portable U-turn signals 460.

FIG. 5 shows another variation of U-turn signal device 10 which includes another type of LED display 50 which can indicate intention to perform a U-turn by lighting the appropriate elements 30 in the LED array 200 to form a "U-turn pattern 310". Alternately, by activation of other signal inputs to the IC control circuit 100, the LED array 200 may display a left turn arrow 320. Thirdly, all LEDs elements 30 in the array 200 may be activated to indicate tail lights are "on". This type of signal device will be referred to as a "combo signal device 300".

FIG. 5 shows the IC control circuit 100 which is connected to the power and signal cord 66. Referring now also to FIG. 3, control circuit 100 includes a power control circuit 110, an IC control circuit 120, and LED array circuit 130. As discussed above, the power and signal cord 66 preferably includes four wires, including a ground line 70, a U-turn activation input line 71, a line which provides on/off state data from the existing tail light system, i.e. tail light status line 72, and a fourth line that provides data from the turn signal indicator system, i.e. a turn signal indicator line 73. Since the inputs from the tail light status input 72, turn signal indicator status input 73 and U-turn activation input 71 all run at 12V, they are routed to the power control circuit 110, which steps the voltage output down to 5V range, for processing by the IC control circuit 120. In response to inputs from these three input sources 71, 72, 73, the IC control circuit 120 produces control signals which activate display pattern activity in the LED array 200. Preferably, the LED array 200 can be controlled to exhibit at least three modes of activity or illumination, beside being turned off.

Firstly, if the tail lights of the existing system are turned on, the on/off state data provided by the tail light status line 72 indicates an "on" condition and the IC control circuit 120 sends signals which activate all the LEDs 200 in weak light mode, to be called "tail light" mode.

Secondly, if the driver indicates a left turn by using the dashboard turn signal indicator 510 (see FIG. 7), for a conventional left turn, the state data provided by the turn signal indicator 73 indicates an "on" condition and the IC control circuit 120 sends signals which activate the LEDs 200 in the shape of a left turn arrow display 320, shown in FIG. 5B, to be called "left turn" mode.

Thirdly, if the driver wishes to indicate performance of a U-turn, the LEDs 200 turn on in a distinctive U-turn arrow pattern display 310, shown in FIG. 5A, which will be called "U-turn mode".

It should be understood that the modes of activity discussed here are not to be construed as limited to the three modes discussed above. There may be fewer modes or more than three, and the modes may include variations other than changes in brightness. These other variations may include changes in color, or exhibition of various patterns which correspond to the various modes. For example, the U-turn mode may present lights which merely illuminate in the U-arrow pattern, or they may flash in sequence, starting at the tail of the arrow and move towards the head, etc.

The positioning and activation of the U-turn signal device 10 is subject to many variations. In particular, the U-turn signal device 10 may be embedded in the vehicle, preferably at time of manufacture, but also available for retro-fit to existing vehicles. In this case, the turn signal indicator may be modified with an extra position for activating the U-turn signal, as will be discussed below. Alternately, the U-turn signal device 10 may be portable U-turn signal 460, and thus suited for mounting in a variety of positions, and may also be of a flexible type of LED 400, as discussed above.

With reference to FIG. 6 to FIG. 10, the embedded U-turn signal device 700 preferably includes a multi-position turn signal switch 500, which provides signals on one of the two input lines, the U-turn signal line 71 and turn signal line 73, to the IC control circuit 100. LED array 200 is of the combo LED configuration 300, capable of displaying both the U-turn display 310 (shown) and the left turn signal 320 (see FIG. 5B) on LED array 200. A monitor screen 600 is provided which can display both a U-turn internal display 610 and a left turn internal display 620. This is preferably implemented by using the existing left turn signal 510, which would activate a standard left turn signal when switch pole "a" 520 in FIG. 8 is activated. This switch would be modified by adding an additional switch pole "b" 530 in FIG. 8. Thus the indicator lever 510 is rotated to a notch further in the left turn signal direction to activate the U-turn signal device 10. When the indicator lever 510 is in position "a" 520, the left turn pole is closed and generates a left turn signal, and when it is in position "b" 510, the U-turn pole is closed and generates a U-turn Signal 310.

Figure 9:
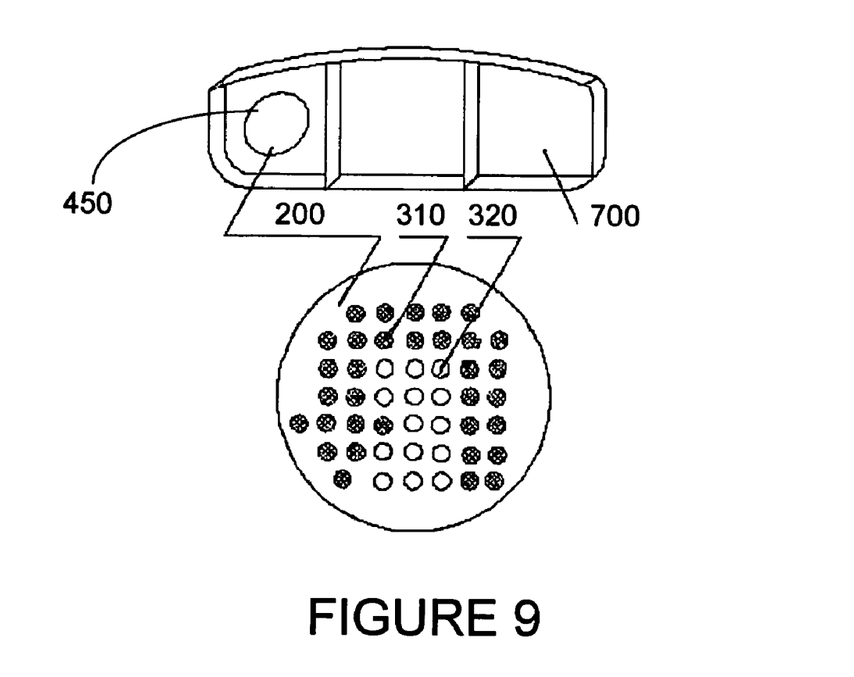
FIG. 9 illustrates a U-turn signal of the present invention coupled to an existing left rear signal light in an embedded U-turn signal device.
Figure 12:
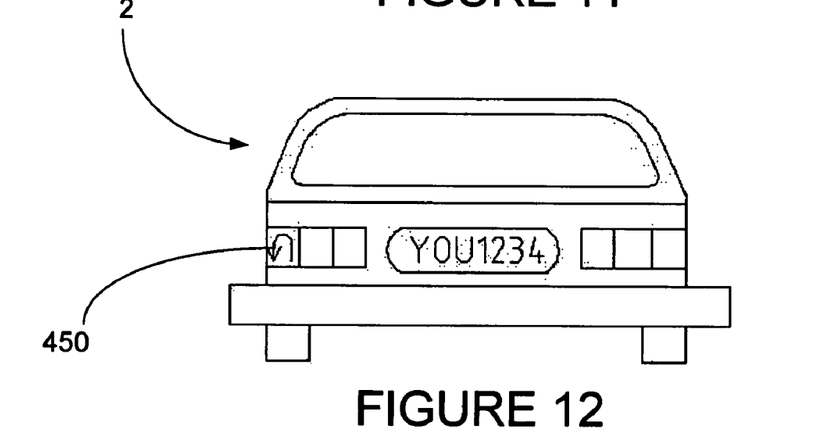
FIG. 12 illustrates the mounting point of an embedded U-turn signal device of the present invention.

The array 200 of the embedded U-turn signal device 450 preferably is integrated with the control circuit 100 on a hard printed circuit board. FIG. 9 shows an example of how an embedded U-turn signal device 450 may be integrated with the existing left rear signal light 700 of a vehicle. Normally, each side of rear light has three sections, which are respectively for integrated turning lights with proposed U-turn Signal 450, a stop light and backup light. LED array 200 is of the combo LED configuration 300, capable of displaying both the U-turn display 310 (shown) and the left turn signal 320 (see also FIG. 5B) on LED array 200. FIG. 12 shows one of its potential mounting points.

Figure 10:
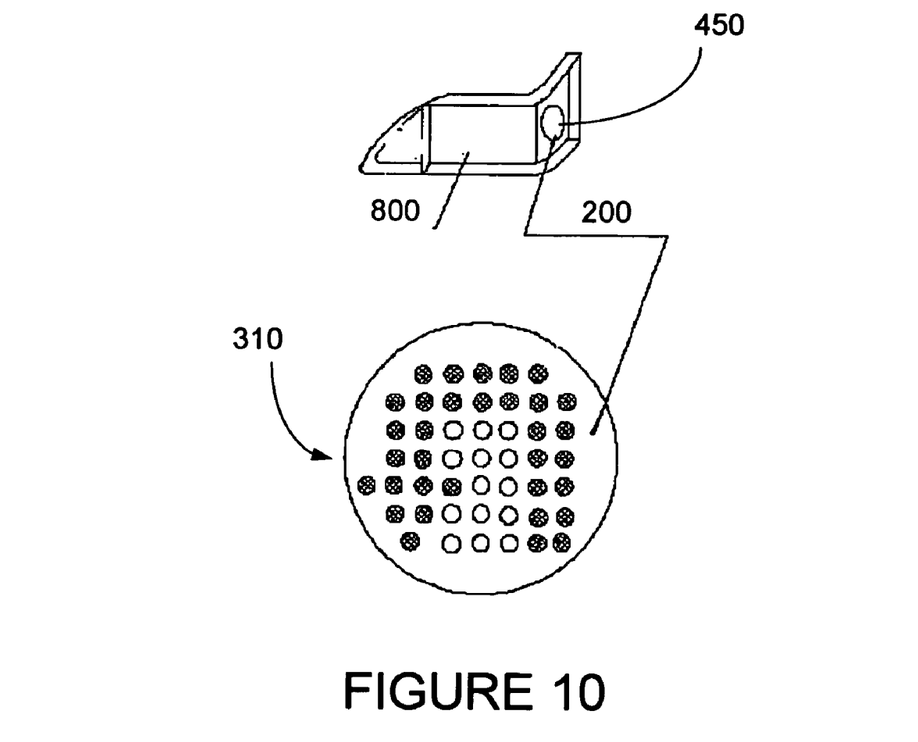
FIG. 10 illustrates a U-turn signal of the present invention coupled to an existing left front signal light in an embedded U-turn signal device.

FIG. 10 shows an example of a front light assembly 800 design. The typical front light also has three sections which are parking light, head light, and integrated turning lights with proposed embedded U-turn signal 450. LED array 200 is of the combo LED configuration 300, capable of displaying both the U-turn display 310 (shown) and the left turn signal 320 (see also FIG. 5B) on LED array 200.

FIG. 11 shows one of several possible mounting positions for a portable U-turn signal 460, which may be a flexible LED array 400.

Figure 13:
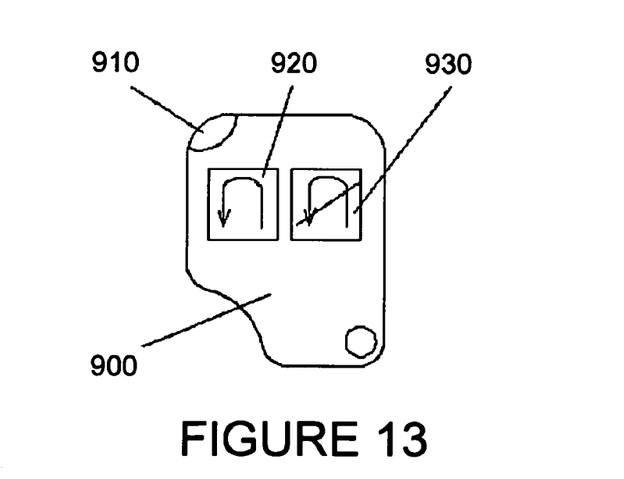
FIG. 13 shows a wireless remote switch of the present invention.

FIG. 13 illustrates a wireless remote switch 900 which includes a U-turn Signal Status indicator 910, U-turn Signal turn on button 920 and turn off button 930. This wireless remote switch 900 is designed to operate with the flexible LED 400 (see FIG. 4) which has a wireless receptor module 430 included in the control circuit 100. This switch is designed to conform to applicable to FCC frequency regulations. When the driver pushes the turn on button 920, the U-turn Signal 10 displays and the U-turn Signal Status indicator 910 also lights as a reminder that the device is on. When the driver pushes the turn off button 930, the U-turn Signal 10 and the U-turn Signal Status indicator 910 turn off.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

INDUSTRIAL APPLICABILITY

The present U-turn signal device 10 is well suited for application as a warning device in vehicles. The U-turn signal device 10 uses an IC control circuit 100 which is connected to the power and signal cord 66. The control circuit 100 includes a power control circuit 110, an IC control circuit 120, and LED array circuit 130. The power and signal cord 66 preferably includes four wires, including a ground line 70, a U-turn activation input line 71, a tail light status line 72 and a turn signal indicator line 73. Since the inputs from the tail light status input 72, turn signal indicator status input 73 and U-turn activation input 71 run at 12V, they are routed to the power control circuit 110, which steps the voltage output down to 5V range, for processing by the IC control circuit 120. In response to inputs from these three input sources, the IC control circuit 120 produces control signals which activate display pattern activity in the LED array 200. Preferably, the LED array 200 can be controlled to exhibit at least three modes of activity or illumination, beside being turned off.

Firstly, if the tail lights of the existing system are turned on, the on/off state data provided by the tail light status line 72 indicates an "on" condition and the IC control circuit 120 sends signals which activate all the LEDs 200 in weak light mode, to be called "tail light" mode.

Secondly, if the driver indicates a left turn by using the dashboard turn signal indicator 510, for a conventional left turn, the state data provided by the turn signal indicator 73 indicates an "on" condition and the IC control circuit 120 sends signals which activate the LEDs 200 in the shape of a left turn arrow 320, to be called "left turn" mode.

Thirdly, if the driver wishes to indicate performance of a U-turn, the LEDs 200 turn on in a distinctive U-turn arrow pattern 310, which will be called "U-turn mode".

The U-turn signal device 10 can be configured in any of a number of variations, including a portable LED array 460, which can be a flexible LED array 400. The U-turn device 10 preferably utilizes an LED array 200 of the combo LED configuration 300, capable of displaying both the U-turn display 310 and the left turn signal 320.

For the above, and other, reasons, it is expected that the emergency stop signal device 10 of the present invention will have widespread industrial applicability. Therefore, it is expected that the commercial utility of the present invention will be extensive and long lasting.

| | |
|---|---|
| 2 | vehicle |
| 10 | U-turn signal device |
| 20 | pulse |
| 30 | LED elements |
| 50 | U-turn display |
| 60 | single-sided U-turn signal |
| 62 | case |
| 64 | transparent window |
| 66 | power and signal cord |
| 68 | mounting bracket |
| 70 | ground |
| 71 | U-turn activation line |
| 72 | tail light signal line |
| 73 | turn signal line |
| 80 | double-sided U-turn signal |
| 100 | control circuit |
| 110 | power control circuit |
| 120 | IC control circuit |
| 130 | LED array circuit |
| 200 | LED array |
| 210 | first LED element |
| 220 | second LED element |
| 300 | combo LED display |
| 310 | U-turn display |
| 320 | left turn display |
| 400 | flexible LED |
| 410 | flexible board |
| 420 | flexible cover |
| 430 | wireless receptor module |
| 450 | embedded signal |
| 460 | portable signal |
| 500 | multi-position turn signal switch |
| 510 | turn indicator lever |
| 520 | switch pole a |
| 530 | switch pole b |
| 600 | monitor screen |
| 610 | U-turn internal display |
| 620 | left turn internal display |
| 700 | left rear signal light |
| 800 | front light assembly |
| 900 | wireless remote switch |
| 910 | wireless status indicator |
| 920 | on button |
| 930 | off button |

What is claimed is:

1. A U-turn signaling device for vehicles, comprising:
   an LED array;
   an integrated circuit control circuit connected to said LED array and which is configured to produce a plurality of LED activation control signals which activate said LED array to a plurality of modes of activity in response to said LED activation control signals, wherein:
   said integrated circuit control circuit produces signals which activate said LED array to at least three modes of activity;
   said at least three modes of activity include a tail light mode, a turn mode and a U-turn mode; and further comprising:
   an input data line connected from an input of said integrated circuit control circuit to a turn signal switch of the vehicle, said input data line accepting input which triggers said IC control circuit to produce activation control signals which activate said LED array to exhibit said turn mode of activity.

2. The U-turn signaling device of claim 1, wherein:
   said LED array is a portable LED array.

3. The U-turn signaling device of claim 1, wherein:
   said LED array is an embedded LED array.

4. The U-turn signaling device of claim 1, wherein:
   said embedded LED array is included as part of the left rear signal light of a vehicle.

5. The U-turn signaling device of claim 1, wherein:
   said embedded LED array is included as part of the front light assembly of a vehicle.

6. The U-turn signaling device of claim 1, wherein:
   said U-turn signaling device is a double-sided LED array.

7. The U-turn signaling device of claim 1, wherein:
   said input data line is further connected from an input of said integrated circuit control circuit to a tail light switch of the vehicle, said input data line accepting input which triggers said integrated circuit control circuit to produce activation control signals which activate said LED array to exhibit said tail light mode of activity.

8. The U-turn signaling device of claim 1, wherein:
   said LED array is a combo LED array.

9. The U-turn signaling device of claim 8, further comprising:
   a monitor screen, whereby internal displays of U-turn signal activation and left turn signal activation are displayed.

10. The U-turn signaling device of claim 9, wherein:
    said monitor screen is mounted in the dashboard of the vehicle.

11. The U-turn signaling device of claim 8, further comprising:
    a multi-position turn signal switch.

12. The U-turn signaling device of claim 11, wherein:
    said multi-position turn signal switch includes a switch pole a for activating left turn signals and a switch pole b for activating U-turn signals.

13. A U-turn signaling device for vehicles, comprising:
    an LED array;
    an integrated circuit control circuit connected to said LED array and which is configured to produce a plurality of LED activation control signals which activate said LED array to a plurality of modes of activity in response to said LED activation control signals, wherein:
    said integrated circuit control circuit produces signals which activate said LED array to at least three modes of activity;
    said at least three modes of activity include a tail light mode, a turn mode and a U-turn mode; and further comprising:

an input data line connected from an input of said integrated circuit control circuit to a U-turn signal activation switch, said input data line accepting input which triggers said IC control circuit to produce activation control signals which activate said LED array to exhibit said U-turn mode of activity.

14. The U-turn signaling device of claim 13, wherein:
said input data line is further connected from an input of said integrated circuit control circuit to a tail light switch of the vehicle, said input data line accepting input which triggers said integrated circuit control circuit to produce activation control signals which activate said LED array to exhibit said tail light mode of activity.

15. The U-turn signaling device of claim 13, wherein:
said LED array is a portable LED array.

16. The U-turn signaling device of claim 13, wherein:
said LED array is an embedded LED array.

17. The U-turn signaling device of claim 13, wherein:
said LED array is a combo LED array.

18. The U-turn signaling device of claim 17, further comprising:
a monitor screen, whereby internal displays of U-turn signal activation and left turn signal activation are displayed.

\* \* \* \* \*